US012478386B2

United States Patent
Oglaza

(10) Patent No.: US 12,478,386 B2
(45) Date of Patent: Nov. 25, 2025

(54) SYSTEMS AND METHODS FOR PROVIDING ACCESS TO WITHIN BONY ANATOMY

(71) Applicant: Stryker Corporation, Kalamazoo, MI (US)

(72) Inventor: Jean-Francois Oglaza, Pins-Justaret (FR)

(73) Assignee: Stryker Corporation, Portage, MI (US)

( * ) Notice: Subject to any disclaimer, the term of this patent is extended or adjusted under 35 U.S.C. 154(b) by 190 days.

(21) Appl. No.: 18/231,908

(22) Filed: Aug. 9, 2023

(65) Prior Publication Data
US 2024/0050105 A1 Feb. 15, 2024

Related U.S. Application Data

(60) Provisional application No. 63/396,750, filed on Aug. 10, 2022.

(51) Int. Cl.
*A61B 17/16* (2006.01)
*A61B 17/34* (2006.01)
*A61B 17/92* (2006.01)
*A61B 90/00* (2016.01)

(52) U.S. Cl.
CPC ...... *A61B 17/1671* (2013.01); *A61B 17/3423* (2013.01); *A61B 17/92* (2013.01); *A61B 90/08* (2016.02); *A61B 2017/922* (2013.01); *A61B 2090/0811* (2016.02)

(58) Field of Classification Search
CPC .. A61B 17/1671; A61B 17/3423; A61B 90/08
See application file for complete search history.

(56) References Cited

U.S. PATENT DOCUMENTS

| 8,986,386 B2 | 3/2015 | Oglaza et al. |
| 11,246,637 B2 * | 2/2022 | Lee .................... A61B 17/7077 |
| 2005/0278036 A1 | 12/2005 | Leonard et al. |

(Continued)

OTHER PUBLICATIONS

Schwarz, Falko et al., "Prospective Randomized Comparison of Early Versus Newer-Generation Vertebral Access Devices for Kyphoplasty", Archives of Orthopaedic and Trauma Surgery, vol. 139, 2019, pp. 1571-1577.

(Continued)

*Primary Examiner* — Si Ming Ku
(74) *Attorney, Agent, or Firm* — Howard & Howard Attorneys PLLC

(57) ABSTRACT

Systems and methods for providing access to within a vertebral body. A stylet is removably disposed within a reamer, and the reamer is removably disposed within a working cannula. A tip of the stylet is positioned distal to a reamer head with a stylet hub being positioned proximal to a reamer hub. The reamer hub may include indicia configured to be aligned with the stylet hub to indicate a distance by which the tip is positioned beyond a distal end of the reamer. Complementary coupling features on the reamer hub and the stylet hub are configured to facilitate the workflow and provide mechanical advantage during removal of the stylet from the reamer. The system may include a spacer device configured to be positioned between the reamer hub and the stylet hub. The spacer device may be coupled to a stylet shaft of the stylet.

19 Claims, 11 Drawing Sheets

(56) References Cited

U.S. PATENT DOCUMENTS

| | | | |
|---|---|---|---|
| 2013/0331840 A1* | 12/2013 | Teisen | A61B 17/1615 |
| | | | 606/80 |
| 2015/0273209 A1* | 10/2015 | Hamilton | A61M 25/09041 |
| | | | 606/129 |
| 2019/0223930 A1* | 7/2019 | Nolan | A61B 17/1633 |

OTHER PUBLICATIONS

YouTube, "Spine Jack Animation Video", https://www.youtube.com/watch?v=v0iUcG1RD_0, May 11, 2014, 6 pages.

* cited by examiner

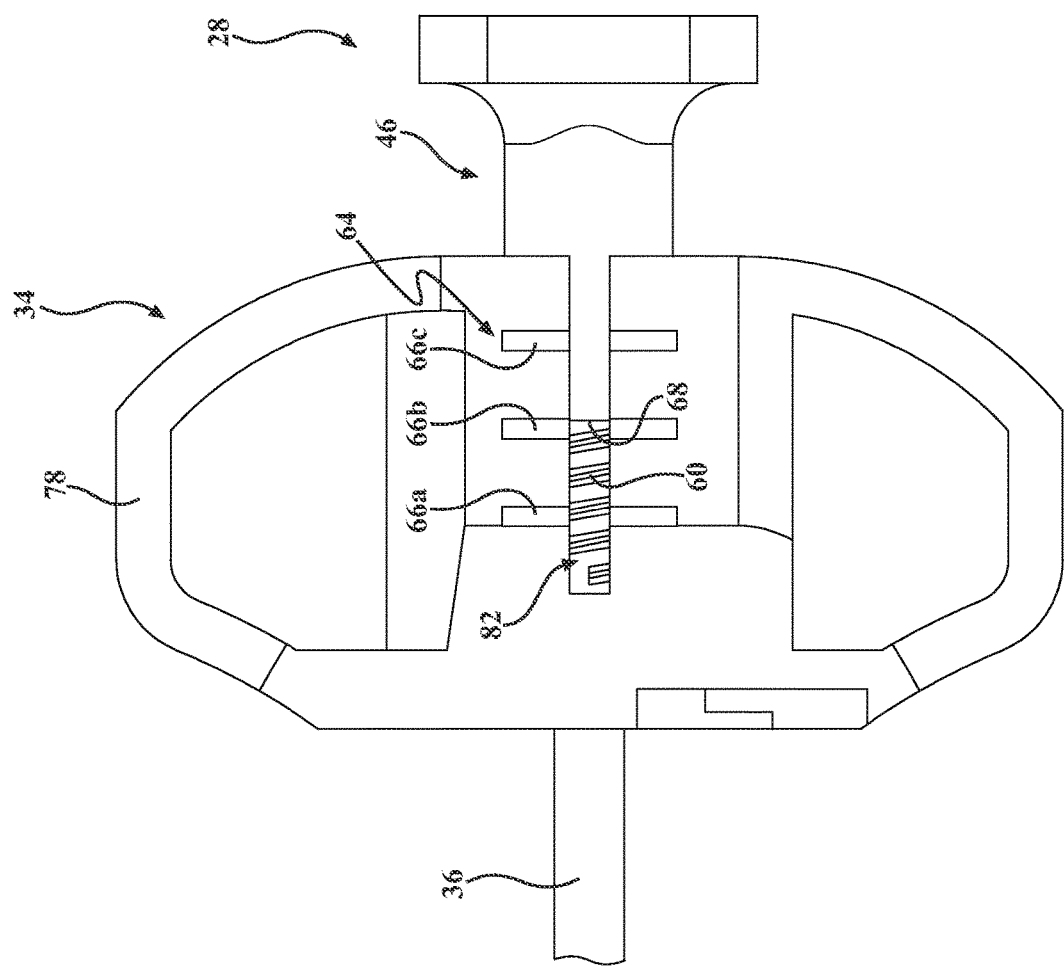

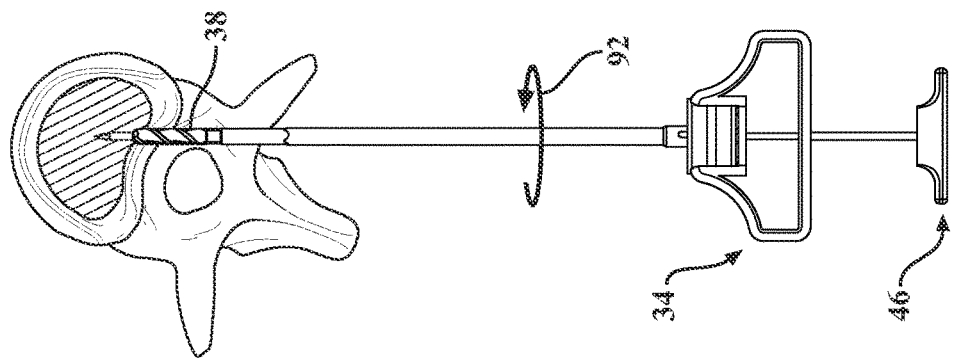
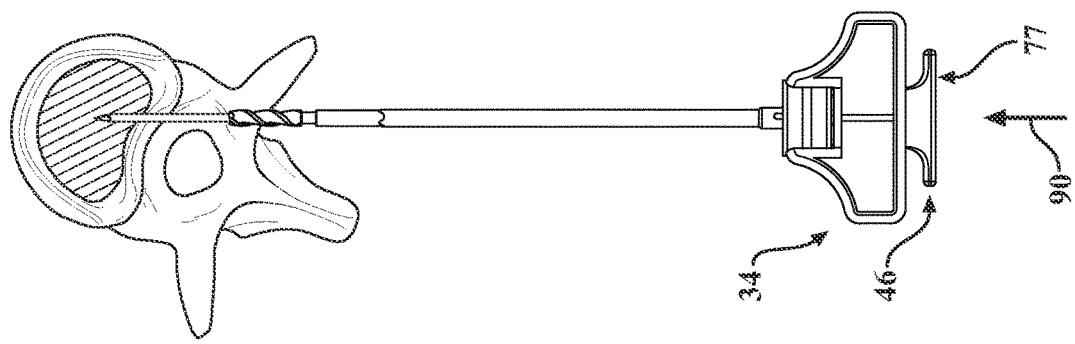
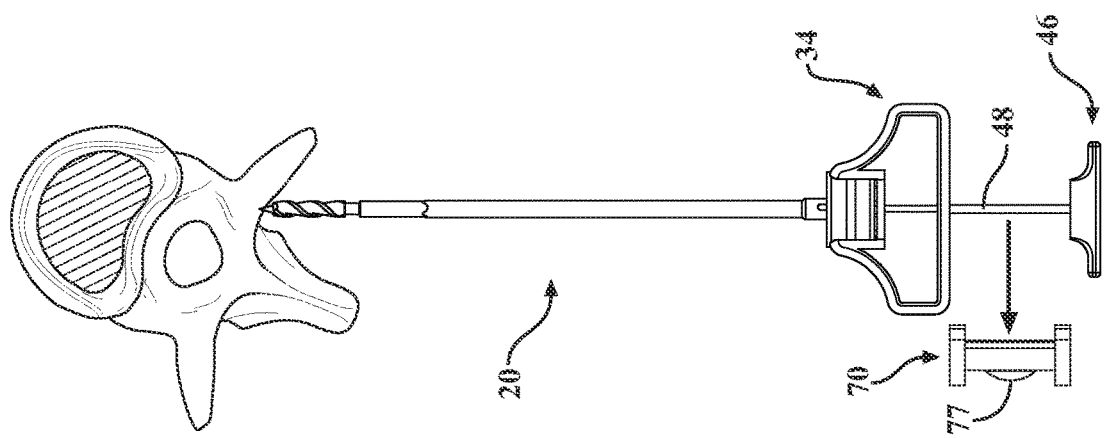
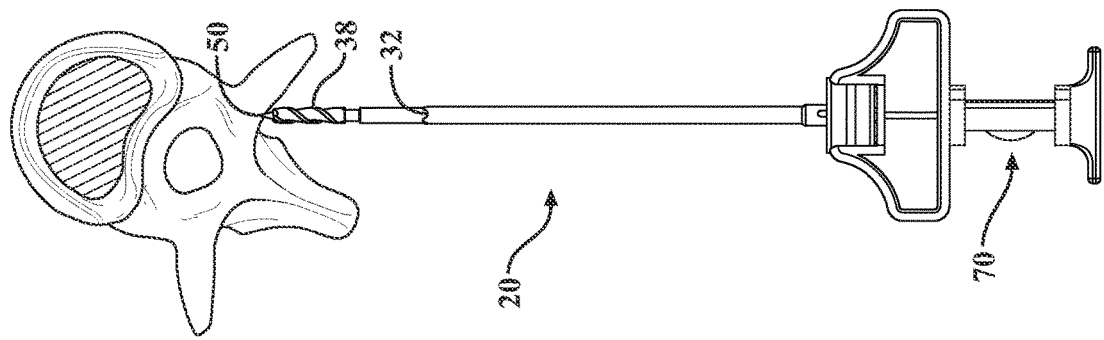

SYSTEMS AND METHODS FOR PROVIDING ACCESS TO WITHIN BONY ANATOMY

PRIORITY CLAIM

This application claims priority to and all the benefits of U.S. Provisional Patent Application No. 63/396,750, filed on Aug. 10, 2022, the entire contents of which are hereby incorporated by reference.

BACKGROUND

A common source of back pain is a vertebral compression fracture in which a weakened or injured vertebral body loses height or collapses. The weakening of the vertebral body may be due to acute injury or, more often, degenerative changes such as osteoporosis.

A manner of restoring height of the vertebral body includes deploying an implant within the vertebral body. One exemplary implant is sold under the tradename Spine-Jack by Stryker Corporation (Kalamazoo, Mich.) and disclosed in commonly-owned U.S. Pat. No. 8,986,386, issued Mar. 24, 2015, the entire contents being hereby incorporated by reference. Owing to the expandable nature of the Spine-Jack device, for example, the size of the implant may require achieving ten gauge or larger access through one or both pedicles of the vertebral body. Doing so may require several separate instruments that are individually and sequentially deployed according to a several step workflow. Select steps of existing systems may include inserting an access cannula, removing a trocar from the access cannula, directing a stylet through the access cannula, decoupling a stylet hub from a stylet shaft, removing the access cannula from over the stylet shaft, directing a reamer over the stylet shaft, removing the stylet shaft, and removing the reamer. Each separate instrument and each workflow step introduce the possibility of inaccuracies or user error, and consume valuable time in which the patient is under anesthesia.

Accordingly, there is a need for systems and methods for providing access to within the bony anatomy, such as the vertebral body, in an intuitive manner that reduces the number of steps and requires less instrumentation.

SUMMARY

The present disclosure is directed to improved systems and methods for providing access to within bony anatomy, such as the vertebral body. The system includes a working cannula, a reamer, and a guidewire or stylet. The working cannula includes a cannula hub, and a cannula shaft extending from the cannula hub to a distal end of the working cannula. The reamer includes a reamer hub, a reamer shaft extending from the reamer hub, and a reamer head disposed on the reamer shaft. The reamer head includes cutting geometries configured to drill or ream through tissue, and in particular cortical and cancellous bone. The stylet includes a stylet hub, and a stylet shaft extending from the stylet hub and terminating a tip. The stylet hub may include a proximal impaction surface configured to be impacted by a surgical mallet.

The reamer shaft is removably disposed within the working cannula, and the reamer hub is removably coupled to the cannula hub. The reamer hub may include a first reamer coupling feature that is removably coupled with a cannula coupling feature of the cannula hub. Engagement of the coupling features may prevent relative rotation movement in a first rotational direction, yet permit decoupling of the working cannula from the reamer when rotated in a second rotational direction opposite the first rotational direction. With the reamer hub removably coupled to the cannula hub, the reamer head is positioned distal to the distal end of the cannula shaft. The reamer hub defines a reamer hub passageway in communication with a reamer lumen. The reamer hub passageway is configured to removably receive the stylet shaft. With the stylet hub positioned proximal to the reamer hub, the tip of the stylet shaft is positioned distal to the reamer head and distal to the distal end of the reamer.

In certain implementations, the reamer hub includes a second reamer coupling feature configured to be removably coupled with a stylet coupling feature of the stylet hub. The reamer hub includes the first and second reamer coupling features with each being removably couplable to a separate component of the system. The second reamer coupling feature and the stylet coupling feature may be threads.

The reamer hub may include a handle that defines a proximal cavity centrally located with the handle. A handle lug may be disposed with the proximal cavity and be spaced apart from the handle to define an annular gap. The external threads forming the second reamer coupling feature are disposed on the handle lug. The internal threads forming the stylet coupling feature are disposed within the tubular portion.

In certain implementations, the system includes indicia configured to provide the user with an approximate distance by which the tip of the stylet is beyond the distal end of the reamer. The indicia may include markings on the reamer hub. Assessing alignment between a distal edge of the stylet hub and the markings indicates the distance by which the tip of the stylet is beyond the distal end of the reamer.

In certain implementations, the system includes a spacer device removably positionable between the reamer hub and the stylet hub. The spacer device may be removably coupled to the stylet shaft. The spacer device includes a spacer body that defines a slot extending longitudinally from an outer surface of the spacer body to a central bore. A defeatable interference engagement maintains the spacer device on the stylet shaft until it is indicated to decouple it from the stylet shaft. The spacer device may further include flanges disposed on opposing ends of the spacer body, and a grip extending radially from the spacer body.

Therefore, according to certain inventive aspects of the present disclosure, the system includes a working cannula comprising a cannula hub, and a cannula shaft extending from the cannula hub to a distal end. A reamer includes reamer comprising a reamer hub, a reamer shaft extending from the reamer hub and defining a reamer lumen, and a reamer head disposed on the reamer shaft. The reamer shaft is removably disposed within the working cannula with the reamer head positioned distal to the distal end of the cannula shaft with the reamer hub removably coupled to the cannula hub. A stylet includes a stylet hub, and a stylet shaft extending from the stylet hub and terminating a tip. The stylet shaft is removably disposed within the reamer with the tip of the stylet being positioned distal to the reamer head with the stylet hub being positioned proximal to the reamer hub.

According to certain inventive aspects of the present disclosure, the system includes a working cannula comprising a cannula hub, and a cannula shaft extending from the cannula hub to a distal end. A reamer includes a reamer hub, a reamer shaft extending from the reamer hub to a distal end and defining a reamer lumen, and a reamer head disposed on the reamer shaft. The reamer shaft is removably disposed within the working cannula with the reamer head positioned distal to the distal end of the cannula shaft, and wherein the reamer hub comprises indicia. A stylet includes comprising a stylet hub, and a stylet shaft extending from the stylet hub and terminating a tip. The stylet shaft is removably disposed within the reamer, wherein the stylet hub is configured to be aligned with the indicia of the reamer hub to indicate a distance by which the tip of the stylet is positioned distal to the distal end of the reamer.

According to certain inventive aspects of the present disclosure, the system includes a working cannula comprising a cannula hub, and a cannula shaft extending from the cannula hub to a distal end. A reamer includes a reamer hub, a reamer shaft extending from the reamer hub and defining a reamer lumen, and a reamer head disposed on the reamer shaft. The reamer shaft is removably disposed within the working cannula with the reamer head positioned distal to the distal end of the cannula shaft. A stylet includes a stylet hub, and a stylet shaft extending from the stylet hub and terminating a tip. The stylet shaft is removably disposed within the reamer. The reamer hub comprises a first coupling feature configured to be removably coupled with the cannula hub, and a second coupling feature configured to be removably coupled with the stylet hub.

BRIEF DESCRIPTION OF THE DRAWINGS

FIG. 5 is an elevation view of a cannula hub of the system of FIG. 1 in which indicia on the cannula hub configured to be aligned with a stylet hub.

FIGS. 9A-9H shows steps of a workflow for providing access to within a vertebral body with the system of FIG. 6.

DETAILED DESCRIPTION

Figure 1:
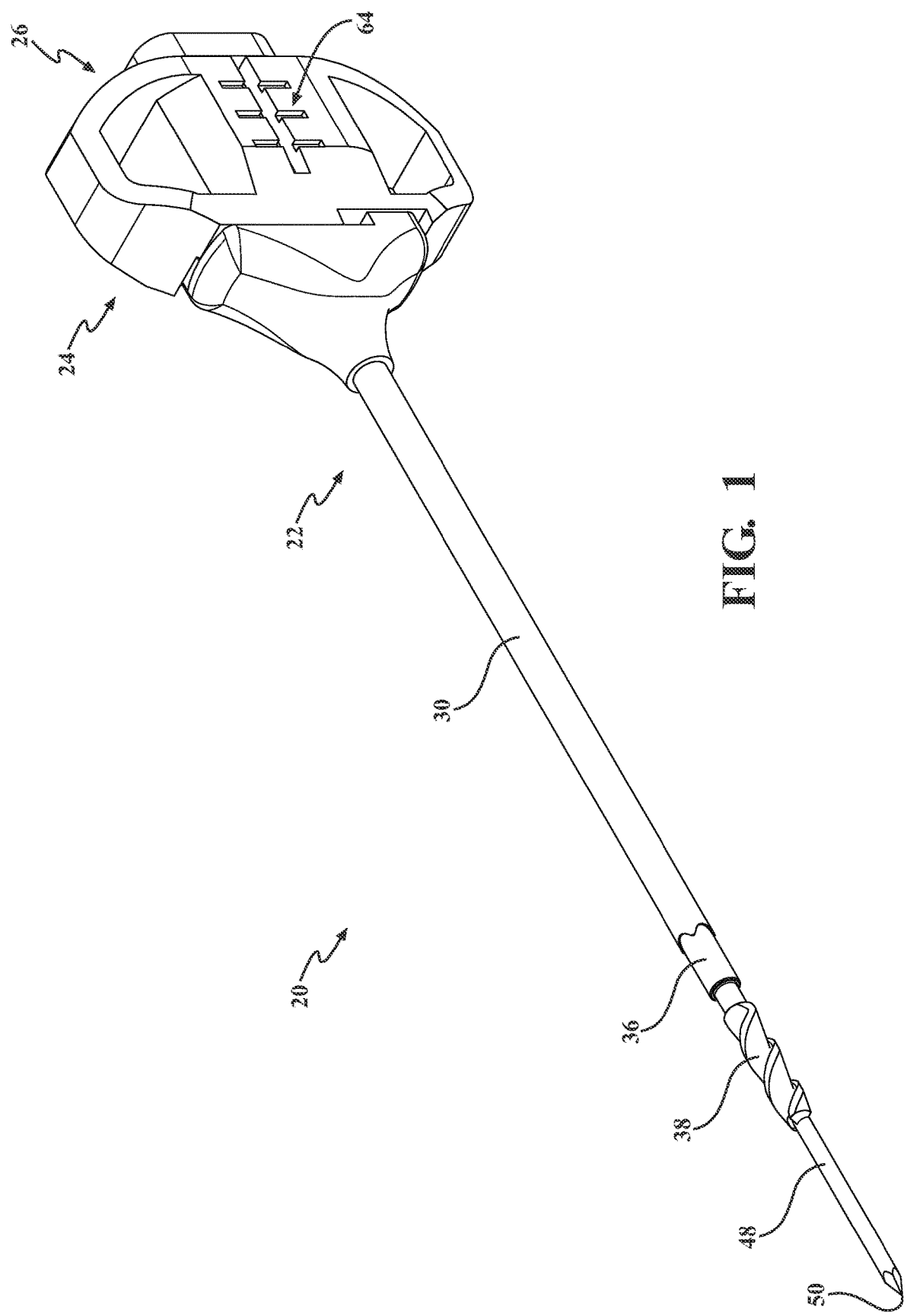
FIG. 1 is a front perspective view of a system configured to provide access to within bony anatomy.

The present disclosure is directed to improved systems and methods for providing access to within bony anatomy, such as the vertebral body. The access may facilitate subsequent deployment of an implant, or introduction of other instrumentation or media. The systems disclosed herein may be used with other bony anatomy through which the implant is to be deployed, for example, long bones (femur, humerus), ileum, skull, or the like. Referring to the figures in which like numerals indicate like components, the system 20 includes a working cannula 22, a reamer 24, and a guidewire or stylet 26. As mentioned, existing systems may implicate the aforementioned components as separate instrumentation to be utilized at specific points in the workflow, however, the system 20 of the present disclosure structurally and functionally integrates the components into a single unit in a unique and advantageous manner to reduce the number of workflow steps and require less handling of separate instrumentation.

The working cannula 22 includes a cannula hub 28, and a cannula shaft 30 extending from the cannula hub 28 to a distal end 32 of the working cannula 22. The distal end 32 of the cannula shaft 30 may include geometries configured to engage the cortical bone. The reamer 24 includes a reamer hub 34, a reamer shaft 36 extending from the reamer hub 34, and a reamer head 38 disposed on the reamer shaft 36. The reamer shaft 36 defines a reamer lumen 40. The reamer head 38 may define a distal end 42 of the reamer 24, as shown, or the reamer head 38 may be axially spaced apart from the distal end 42. The reamer head 38 includes cutting geometries configured to drill or ream through tissue, and in particular cortical and cancellous bone. A necked portion 44 may demarcate the reamer head 38 from a proximal portion of the reamer shaft 36. The stylet 26 includes a stylet hub 46, and a stylet shaft 48 extending from the stylet hub 46 and terminating a tip 50. The tip 50 may be diamond-shaped or another suitably sharp geometry configured to pierce the pedicle of the vertebral body with an axially-directed force (e.g., impaction). To that end, the stylet hub 46 may include a proximal impaction surface 47 configured to be impacted by a surgical mallet to provide the axially-directed force to cause the tip 50 to pierce and be advanced within the bony anatomy.

Figure 2:
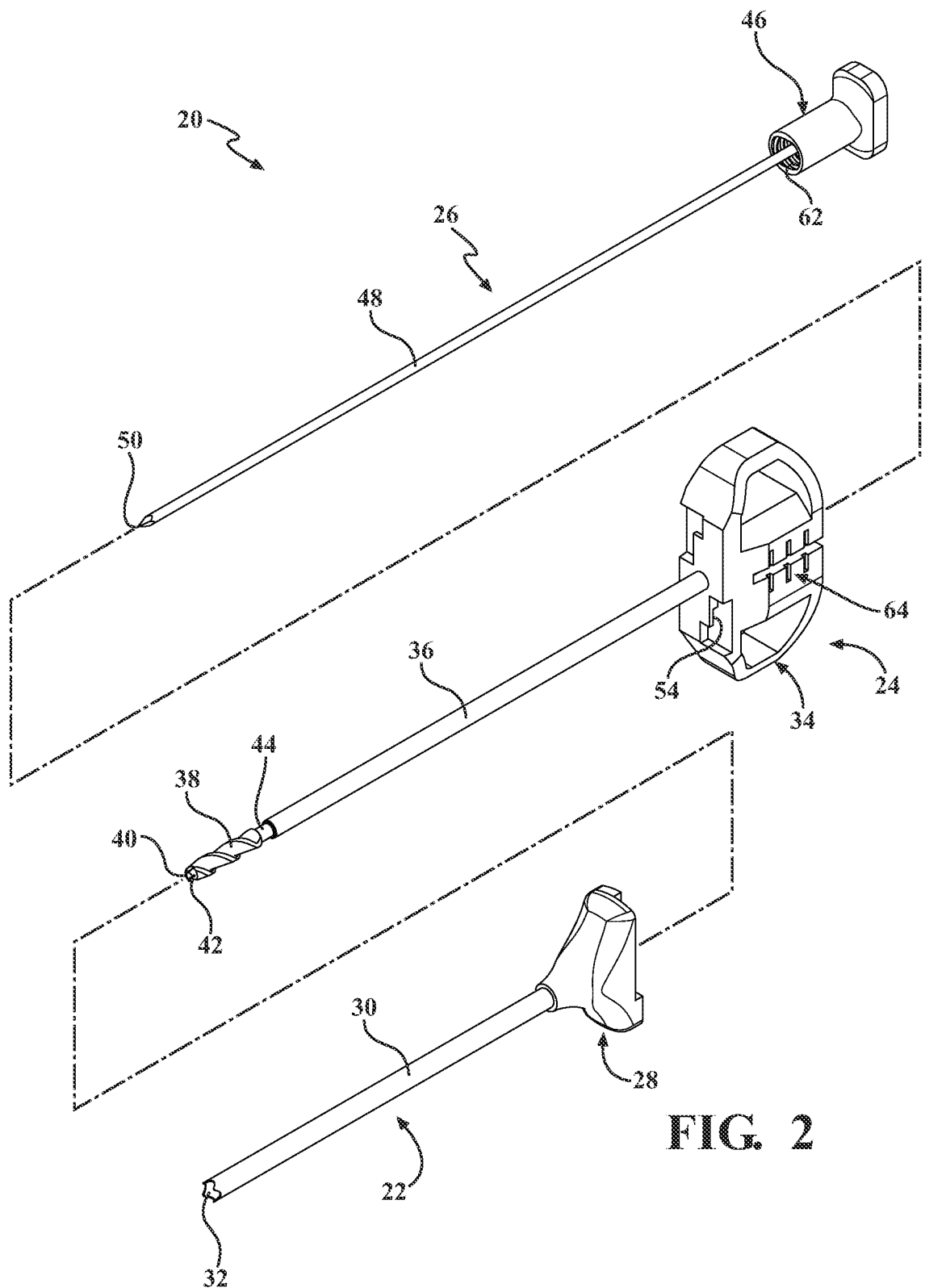
FIG. 2 is an exploded front perspective view of the system.
Figure 3:
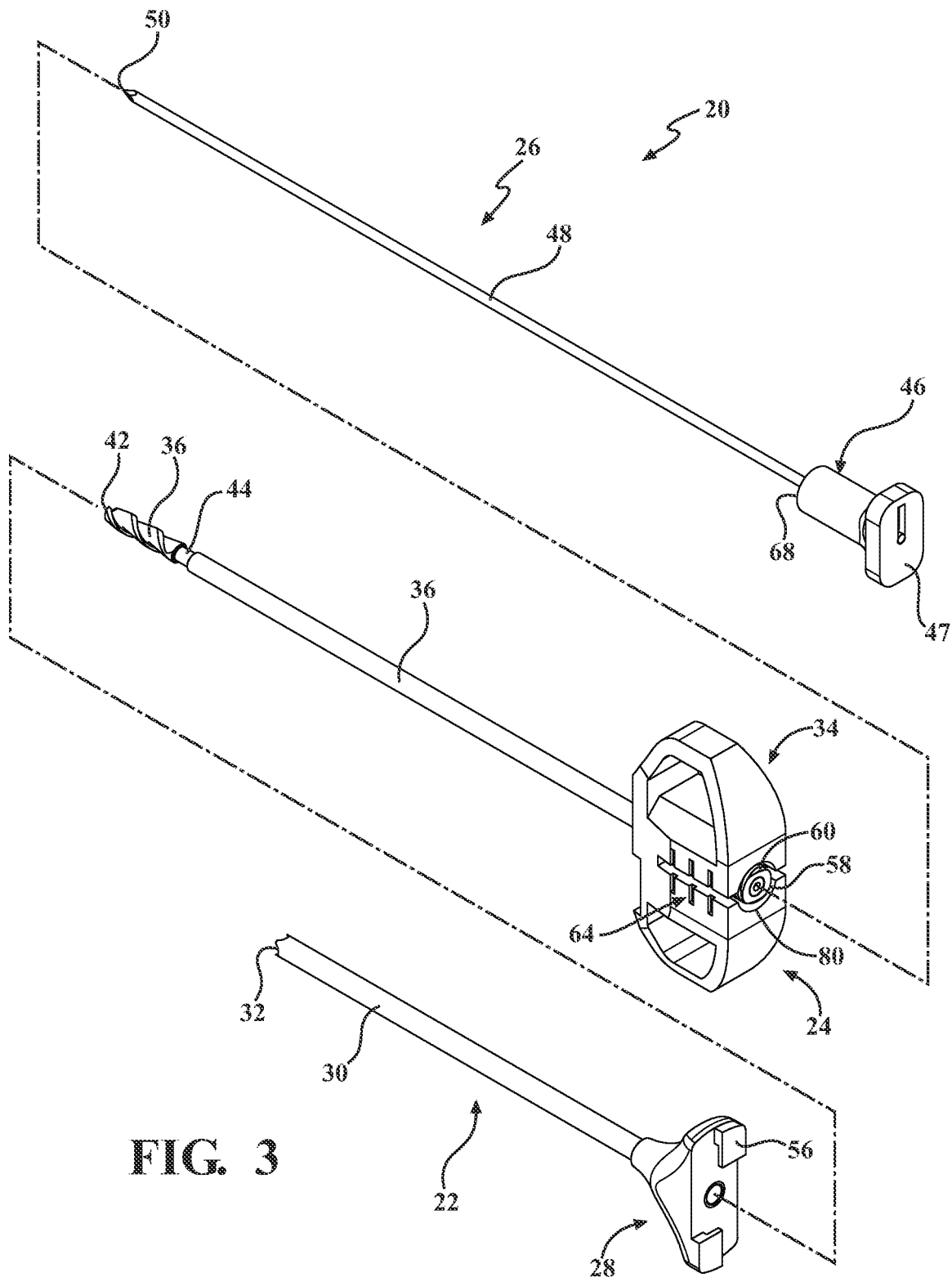
FIG. 3 is an exploded rear perspective view of the system.

The reamer shaft 36 is removably disposed within the working cannula 22, and the reamer hub 34 is removably coupled to the cannula hub 28. The reamer hub 34 may include a first reamer coupling feature 54 that is removably coupled with a cannula coupling feature 56 of the cannula hub 28. FIGS. 2 and 3 show the first reamer coupling feature 54 as recesses sized to receive tabs forming the cannula coupling feature 56. The engagement between the tabs and the recesses prevents relative axial movement between the working cannula 22 and the reamer 24. The engagement may further prevent relative rotation movement in a first rotational direction, yet permit decoupling of the working cannula 22 from the reamer 24 when rotated in a second rotational direction opposite the first rotational direction. In certain implementations, the reamer hub 34 defines a distal cavity 52 sized to receive the cannula hub 28 (see FIGS. 7 and 8). The first reamer coupling feature 54 is disposed within the distal cavity 52. The first reamer coupling feature 54 may be tabs sized to be disposed within circular slots forming the cannula coupling feature 56. With the reamer hub 34 removably coupled to the cannula hub 28, the reamer head 38 is positioned distal to the distal end 32 of the cannula shaft 30. In one example, the distal end 32 of the cannula shaft 30 is configured to be spaced apart from the reamer head 38 by a sufficient distance such that, with the reamer head 38 engaging the pedicle, the distal end 32 of the working cannula 22 may be external to soft tissue overlying the pedicle.

The reamer hub 34 defines a reamer hub passageway 58 in communication with the reamer lumen 40. The reamer hub passageway 58 is configured to removably receive the stylet shaft 48. Therefore, the stylet 26 is coaxially disposed within the reamer 24, which is coaxially disposed within the working cannula 22. With the stylet hub 46 positioned proximal to the reamer hub 34, the tip 50 of the stylet shaft 48 is positioned distal to the reamer head 38 and distal to the distal end 42 of the reamer 24. Similarly, the reamer hub 34 is positioned proximal to the cannula hub 28, and the stylet hub 46 is positioned proximal to the reamer hub 34. Existing systems cannot accommodate three-component integration to perform the workflow steps to be described. Rather, as mentioned, existing systems may require a stylet hub to be removed for the stylet to subsequently function as a guidewire.

Referring now to FIGS. 1-3 showing a first implementation of the system 20, the reamer hub 34 further includes a second reamer coupling feature 60 configured to be removably coupled with a stylet coupling feature 62 of the stylet hub 46. Therefore, the reamer hub 34 includes the first and second reamer coupling features 54, 60 with each being removably couplable to a separate component of the system 20. The illustrated implementation shows the second reamer coupling feature 60 and the stylet coupling feature 62 as complementary threads. Alternatively, the second reamer coupling feature 60 and the stylet coupling feature 62 may be selected from the group consisting of a detent, a clip, a spring-loaded pin, interference fit, and friction fit.

With concurrent reference to FIG. 5, the reamer hub 34 may include a handle 78 that defines a proximal cavity 80 centrally located with the handle 78. A handle lug 82 may be disposed with the proximal cavity 80 and be spaced apart from the handle 78 to define an annular gap, as best shown in FIG. 3. The external threads forming the second reamer coupling feature 60 are disposed on the handle lug 82. An inner diameter of a tubular portion of the stylet hub 46 is sized complementary to the outer diameter of the handle lug 82. The internal threads forming the stylet coupling feature 62 are disposed within the tubular portion, as best shown in FIG. 2. With the complementary threads engaged, the axial position of the stylet 26 is maintained relative to the reamer 24; and with the first reamer coupling feature 54 and the cannula coupling feature 56 engaged, the axial position of the reamer 24 is maintained relative to the working cannula 22. Therefore, the system 20 may be selectively manipulated as a single unit for certain steps of the workflow to now be described.

Figure 4D:
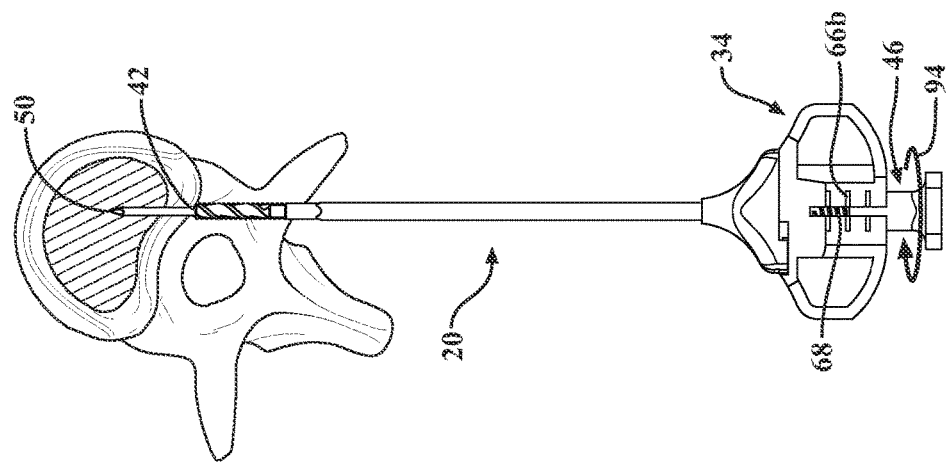
FIGS. 4A-4H shows steps of a workflow for providing access to within a vertebral body with the system of FIG. 1.
Figure 4C:
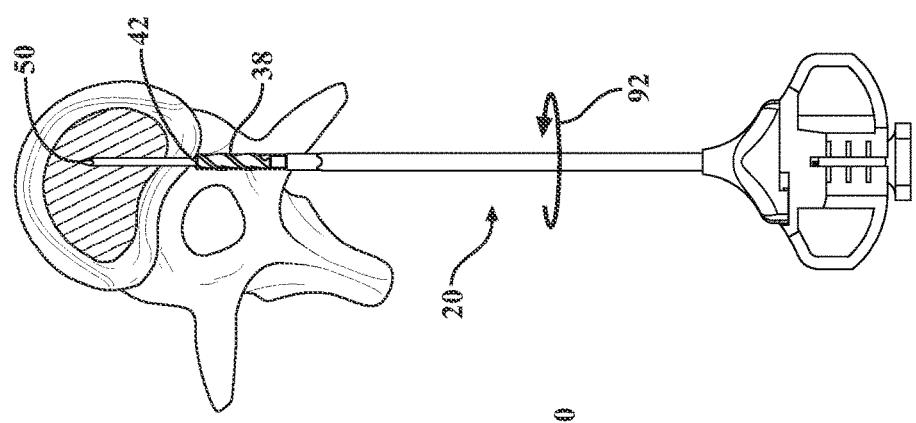
Figure 4B:
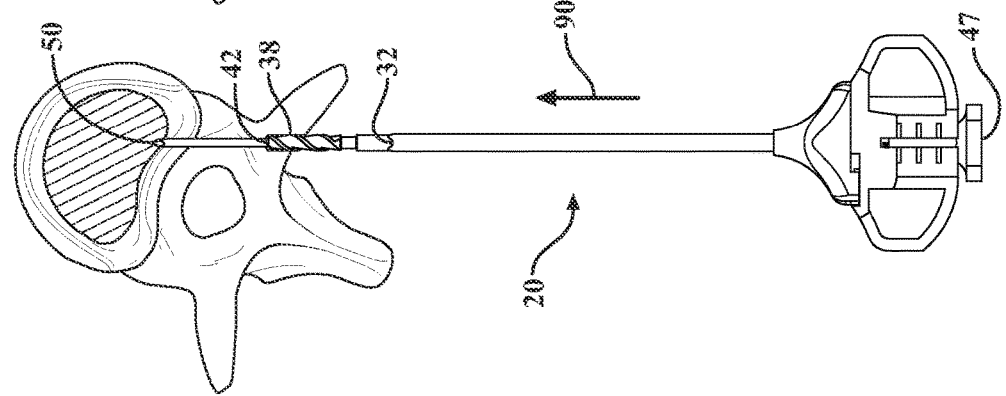
Figure 4A:
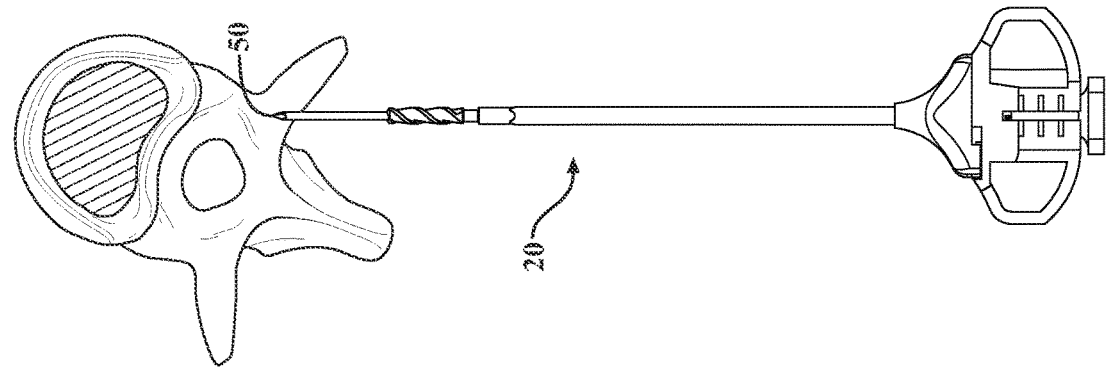

Referring to FIGS. 4A-4G, an exemplary workflow is shown in which access to within the vertebral body through the pedicle is achieved with the first implementation of the system 20. A percutaneous incision may be made to the soft tissue overlying the pedicle. The tip 50 of the stylet 26 is directed through the percutaneous incision. The position of the tip 50 and the orientation of the system 20 may be confirmed on fluoroscopy. The system 20 may be distally advanced into the pedicle (arrow 90). For example, the proximal impaction surface 47 of the stylet 26 may be impacted with a surgical mallet with the user supporting the system 20 with the other hand. Alternatively, the user may grasp the reamer hub 34 and manually provide the necessary forces (e.g., pushing and twisting) to cause the tip 50 to penetrate through the pedicle and to within the vertebral body. In other words, the user may advance the stylet 26 while simultaneously operating the reamer 24 to drill or ream through the pedicle to within the vertebral body. Owing to engagement between the corresponding coupling features 54, 56, 60, 62, movement of the stylet hub 46 relative to the reamer hub 34 is prevented and the system 20 may be confidently forced through the pedicle as a single unit. The user may stop advancement upon detecting resistance from the pedicle against the reamer head 38, or just after purchase is achieved with the reamer head 38 within the pedicle. FIG. 4B shows the distal end 42 of the reamer 24 engaging the pedicle. With the reamer head 38 engaging the pedicle, the distal end 32 of the working cannula 22 may remain above the overlying soft tissue. Alternatively, the user may stop advancement with the tip 50 of the stylet 26 positioned in the posterior one-third of the vertebral body, which may be confirmed on fluoroscopy.

The method includes advancing the stylet and the reamer 24 to ream through the pedicle. FIG. 4C shows a rotational input (arrow 92) being provided to the system 20 to cause the reamer head 38 to ream at least partially through the pedicle. The stylet 26, whose axial position relative to the reamer 24 is selectively fixed, is advanced further into the vertebral body. The system 20 may be advanced through the pedicle by any suitable distance. FIG. 4C shows the distal end 42 of the reamer 24 at the cortical wall. In another example, the reamer 24 may be advanced into the posterior one-third of the vertebral body.

Figure 4H:
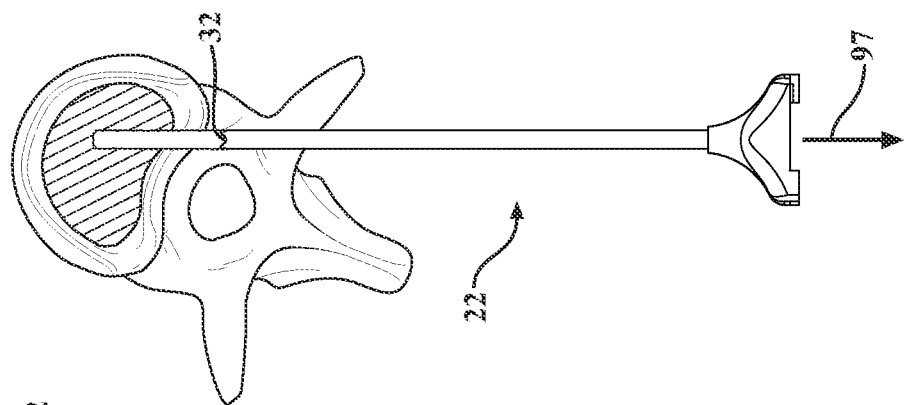
Figure 4G:
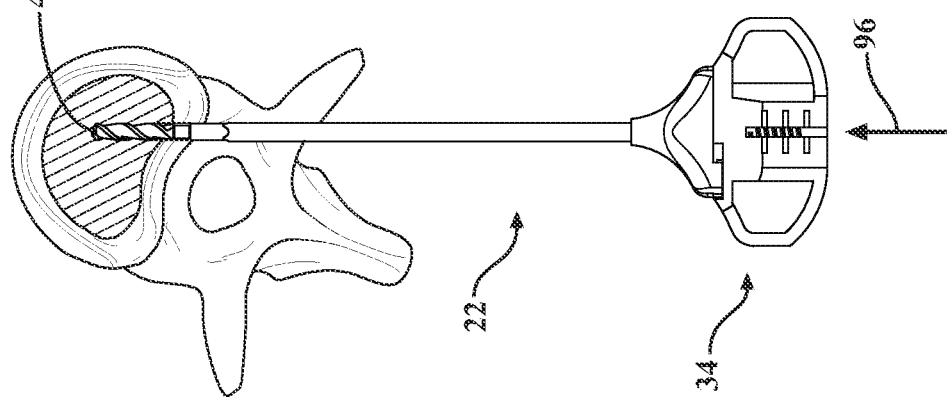
Figure 4F:
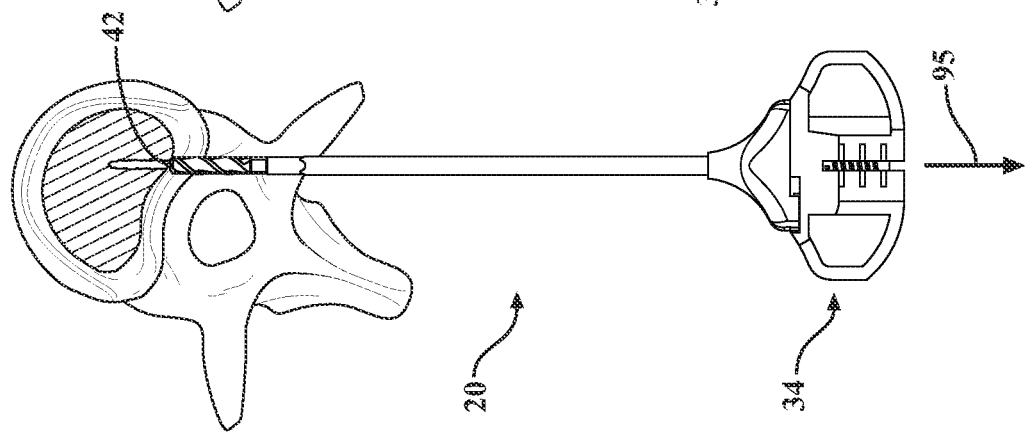

The stylet 26 is retracted relative to or removed from the reamer 24. The stylet coupling feature 62 may be decoupled from the second reamer coupling feature 60. The step may include providing a rotational input (arrow 94) to the stylet hub 46 relative to the reamer hub 34 to cause the complementary threads to disengage. Particularly in instances where the stylet shaft 48 is firmly anchored within the cortical or cancellous bone, the threaded interface with the rotational input provides a mechanical advantage to disengage the tip 50 of the stylet 26 from the bone. The rotational input may lessen or obviate the need for pulling forces on the system 20, which may otherwise shift, dislodge, or loosen purchase between the system 20 and the tissue. Once disengaged, the stylet 26 may be axially removed from the reamer 24 (arrow 95), as shown in FIG. 4F. The reamer 24 may be further advanced into the vertebral body, if desired, as shown in FIG. 4G. The purchase between the reamer head 38 and the pedicle may constrain the trajectory of further advancement despite previous removal of the stylet 26. Once the reamer head 38 has formed the working channel to the desired depth, the reamer 24 may be removed from the working cannula 22. The first reamer coupling feature 54 is decoupled from the cannula coupling feature 56, and the reamer 24 is removed from the working cannula 22 (arrow 98). As best shown in FIG. 4H, the result is the working channel formed within the vertebral body for insertion of an implant or subsequent instrumentation through the working cannula 22 engaging the pedicle. Moreover, since the reamer 24 was utilized to ream the working channel, the size of the working channel may be ten gauge or larger. The method may include the step of delivering the implant through the working cannula 22 and to within the vertebral body after the step of removing the reamer 24 from the working cannula 22.

In certain implementations, the system 20 includes indicia 64 configured to provide the user with an approximate distance by which the tip 50 of the stylet 26 is beyond the distal end 42 of the reamer 24 in situ. Referring to FIG. 5, the indicia 64 may include markings 66 on the reamer hub 34. More particularly, a first marking 66a, a second marking 66b, and a third marking 66c are spaced apart from one another and positioned adjacent to a slot that permits the handle lug 82 to be visible. Assessing alignment between a distal edge 68 of the stylet hub 46 and the markings 66 indicates the distance by which the tip 50 of the stylet 26 is beyond the distal end 42 of the reamer 24. For example, the markings 66 may be spaced apart from one another at fixed intervals, such as one centimeter. Should the distal edge 68 be aligned with the first marking 66a, it may be assumed the stylet shaft 48 is extending beyond the distal end 42 of the reamer 24 by three centimeters. And should the distal edge 68 be aligned with the second marking 66b or the third marking 66c, it may be assumed the stylet shaft 48 is extending beyond the distal end 42 of the reamer 24 by two centimeters and one centimeter, respectively. Therefore, the user may incrementally advance the reamer 24 within the vertebral body while alternatingly withdrawing the stylet 26. Among other advantages, the arrangement ensures the tip 50 of the stylet 26 does not become unduly close to the anterior cortical wall. Further, once sufficient purchase is established between the reamer head 38 and the pedicle, the guidance provided of the stylet shaft 48 is of increasingly less necessity and may be retracted or removed.

Figure 4E:
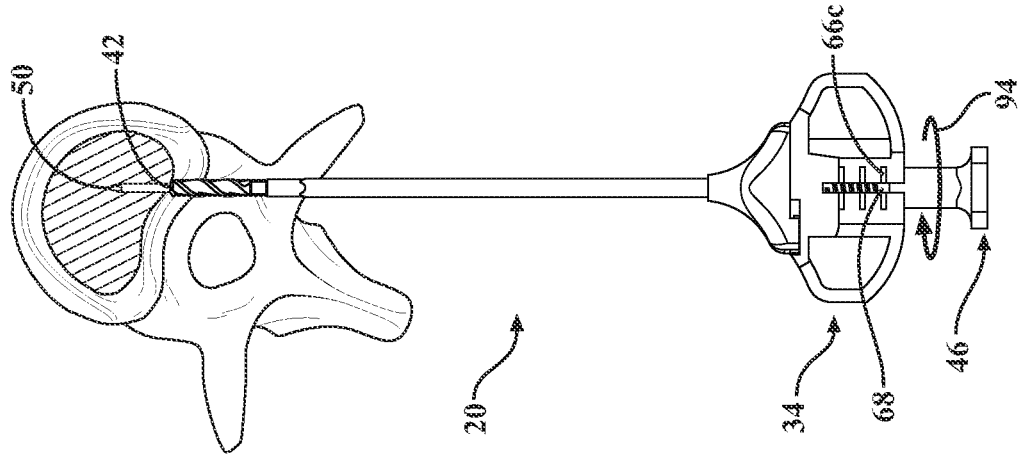

Returning to the workflow, FIG. 4D shows the step of rotating the stylet hub 46 (arrow 94) to retract the stylet 26 relative to the reamer 24 (and the working cannula 22). The distal edge 68 of the stylet hub 46 is aligned with the second marking 66*b*, and it observable that the distance by which the tip 50 is beyond the distal end 42 of the reamer 24 is less than that of FIGS. 4A-4C. Likewise, FIG. 4E shows the distal edge 68 of the stylet hub 46 being aligned with the third marking 66*c*, and it observable that the distance by which the tip 50 is beyond the distal end 42 of the reamer 24 is less than that of FIG. 4D.

Figure 6:
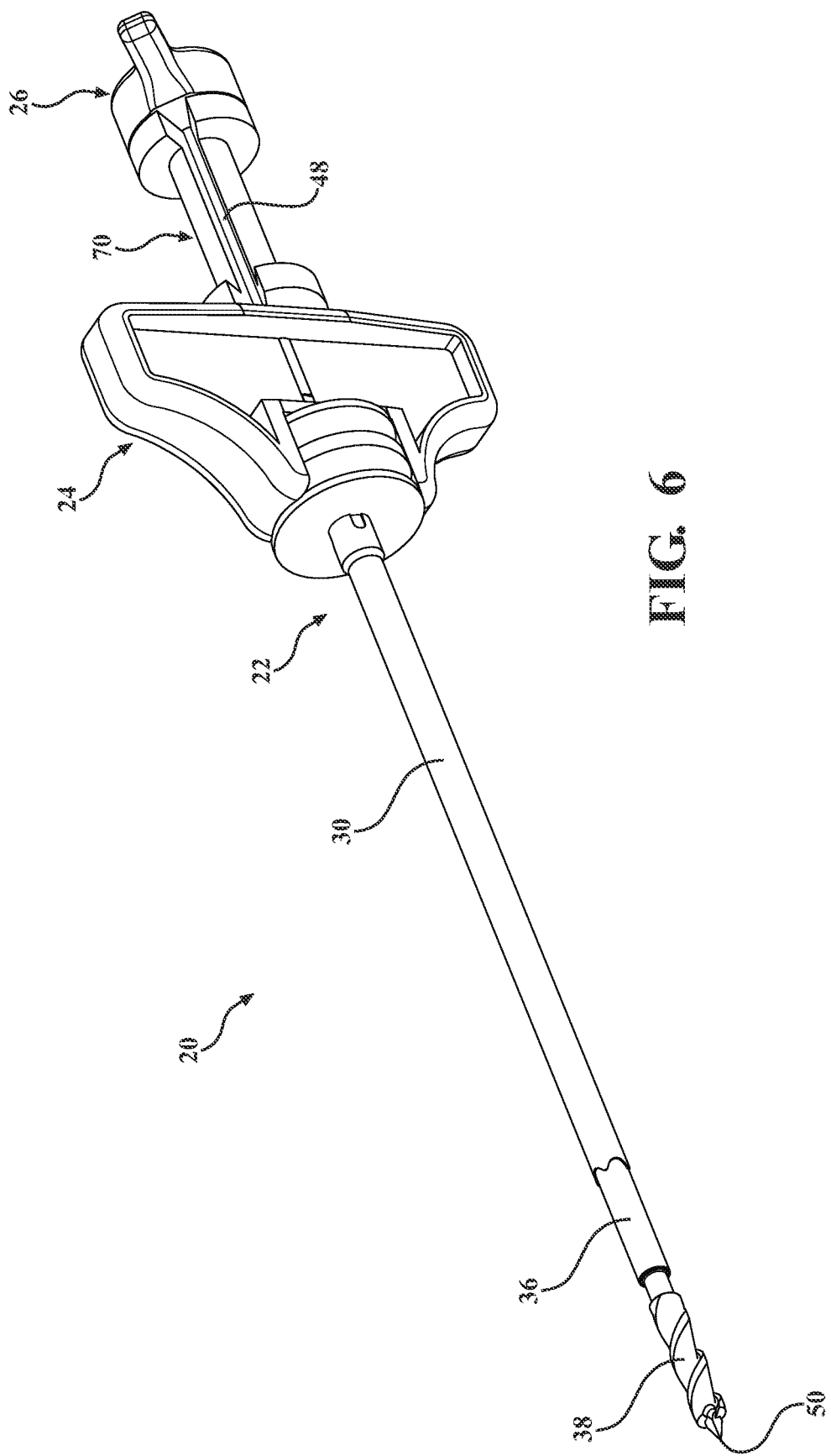
FIG. 6 is a front perspective view of another system configured to provide access to within bony anatomy.
Figure 7:
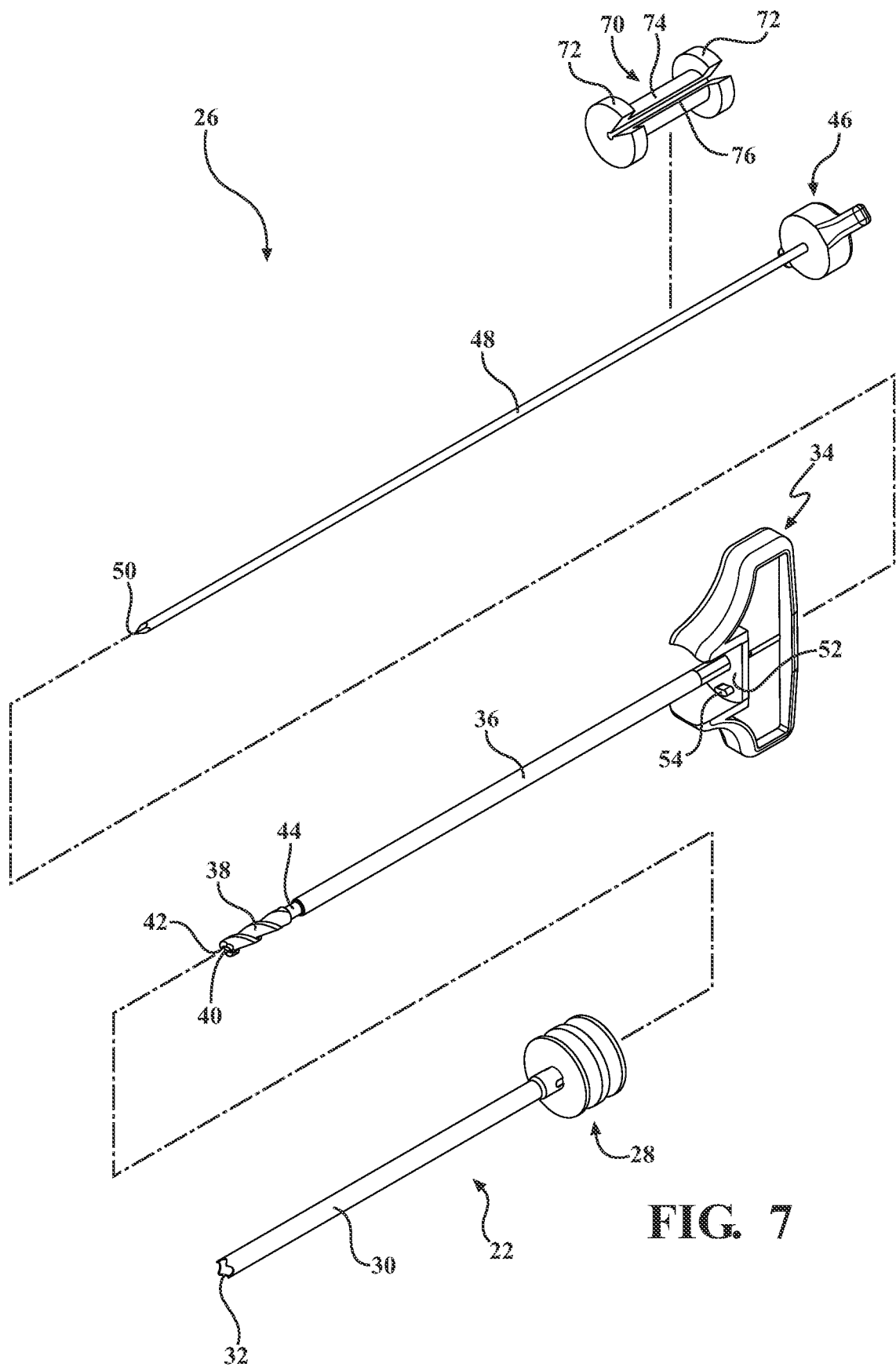
FIG. 7 is an exploded front perspective view of the system.
Figure 8:
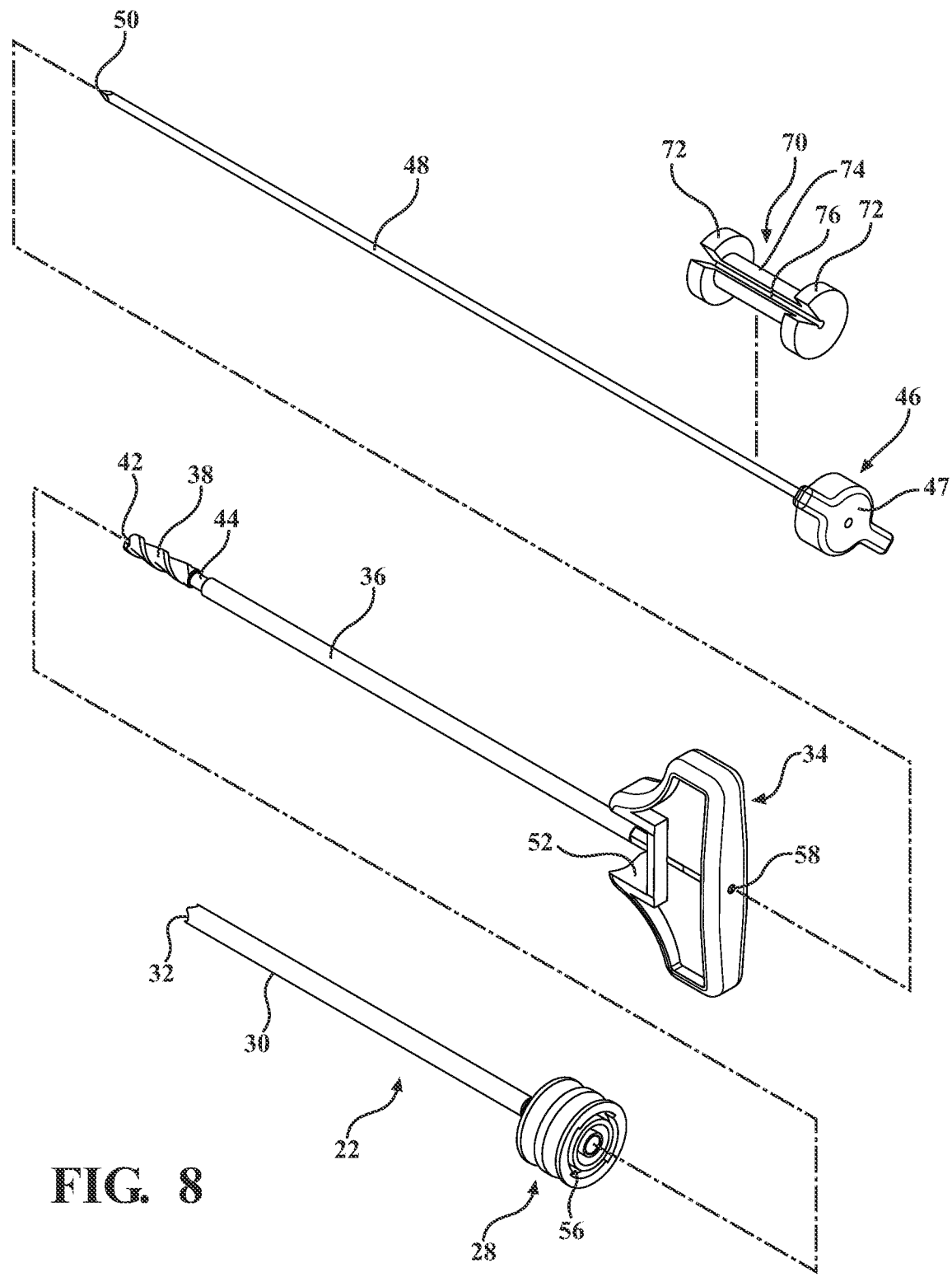
FIG. 8 is an exploded rear perspective view of the system.

A second implementation of the system 20 is shown in FIGS. 6-8 with like numerals indicating like components. Again, the working cannula 22 includes the cannula hub 28, and the cannula shaft 30 extending from the cannula hub 28. The reamer 24 includes the reamer hub 34, the reamer shaft 36 extending from the reamer hub 34, and the reamer head 38 disposed on the reamer shaft 36. The stylet 26 includes the stylet hub 46, and the stylet shaft 48 extending from the stylet hub 46 and terminating the tip 50. It is appreciated that the form factor of the hubs 28, 34, 46 vary from the first implementation, and the certain ergonomic differences to the form factor may be interchangeable between the implementations. It is further observed that the tip 50 of the stylet 26 is approximately in registration with the distal end 42 of the reamer 24, which also varies from the first implementation.

The system 20 includes a spacer device 70 removably positionable between the reamer hub 34 and the stylet hub 46. More particularly, the spacer device 70 is configured to be removably coupled to the stylet shaft 48. In one example, the spacer device 70 is configured to be clipped onto the stylet shaft 48. The spacer device 70 includes a spacer body 74 that defines a slot 76 extending longitudinally from an outer surface of the spacer body 74 to a central bore. The slot 76 is sized to receive the stylet shaft 48. A defeatable interference engagement maintains the spacer device 70 on the stylet shaft 48 until it is indicated to decouple it from the stylet shaft 48. The spacer device 70 may further include flanges 72 disposed on opposing ends of the spacer body 74, and a grip 77 (see FIG. 9B) extending radially from the spacer body 74.

When positioned between the reamer hub 34 and the stylet hub 46, the spacer device 70 configured to prevent distal movement of the stylet 26 relative to the reamer 24. More particularly, the flanges 72 are configured to be positioned in an abutting relationship the reamer hub 34 and the stylet hub 46 such that the axially-directed force on the proximal impaction surface 47 of the stylet hub 46 is effectively transferred to the reamer hub 34. Further, a length of the spacer device 70 defined between the flanges 72 is such that, with the spacer device 70 disposed between the stylet hub 46 and the reamer hub 34, the tip 50 of the stylet shaft 48 is in registration with the distal end 42 of the reamer shaft 36.

Referring now to FIGS. 9A-9G, an exemplary workflow is shown in which access to within the vertebral body through the pedicle is achieved with the second implementation of the system 20. The tip 50 of the stylet 26 is directed through the percutaneous incision to engage the pedicle. The position of the tip 50 and the orientation of the system 20 may be confirmed on fluoroscopy. During initial insertion of the system 20, the spacer device 70 prevents distal movement of the stylet hub 46 towards the reamer hub 34. It is observed that the distal end 32 of the working cannula 22 may remain above the overlying tissue, whereas the reamer head 38 may be closer the pedicle at this point more so than the first implementation of the system 20.

The spacer device 70 is removed from between the reamer hub 34 and the stylet hub 46. For example, the user may pinch the grip 77 and decouple the spacer device 70 from the stylet shaft 48. The stylet 26 is then advanced within the reamer 24 such that the tip 50 of the stylet 26 is deployed through the pedicle and to within the vertebral body (arrow 90). The step of advancing the stylet 26 may include impacting the proximal impaction surface 47 of the stylet 26 with the surgical mallet. The stylet hub 46 may be moved into an abutting relationship with the reamer hub 34, or a portion of the distance thereto. Owing to the tip 50 of the stylet 26 being in registration with the distal end 42 of the reamer 24, the distance by which the stylet hub 46 is moved towards the reamer hub 34 may be assumed to be the distance by which the tip 50 of the stylet 26 is positioned beyond the reamer 24. This distance may be tuned (based on the length of the spacer device 70) such that the tip 50 of the stylet 26 is positioned in the posterior one-third of the vertebral body. The user may also advance the reamer 24 to achieve purchase with the reamer head 38. For example, FIG. 9C shows the distal end 42 of the reamer 24 engaging the pedicle.

FIG. 9D illustrates the step of advancing the reamer 24 along the stylet 26. The reamer 24 may be operated to drill or ream through the pedicle with the reamer head 38. The rotational input (arrow 92) being provided to the reamer hub 34 causes the reamer head 38 to ream at least partially through the pedicle. Unlike the first implementation, the relative axial position between the stylet 26 and the reamer 24 is not constrained, and therefore resistance on the tip 50 from the cancellous bone may cause the axial position of the stylet 26 to be maintained as the reamer 24 is advanced. In other words, FIG. 9D shows the distal end 42 of the reamer 24 adjacent the cortical wall with the stylet hub 46 now again spaced apart from the reamer hub 34. In another example, the reamer 24 may be advanced into the posterior one-third of the vertebral body.

Figure 9H:
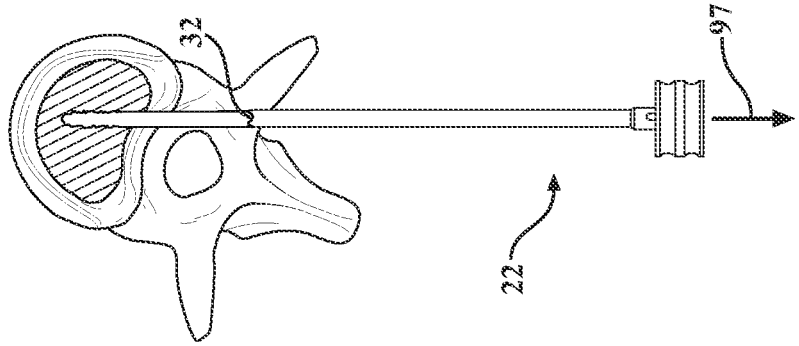
Figure 9G:
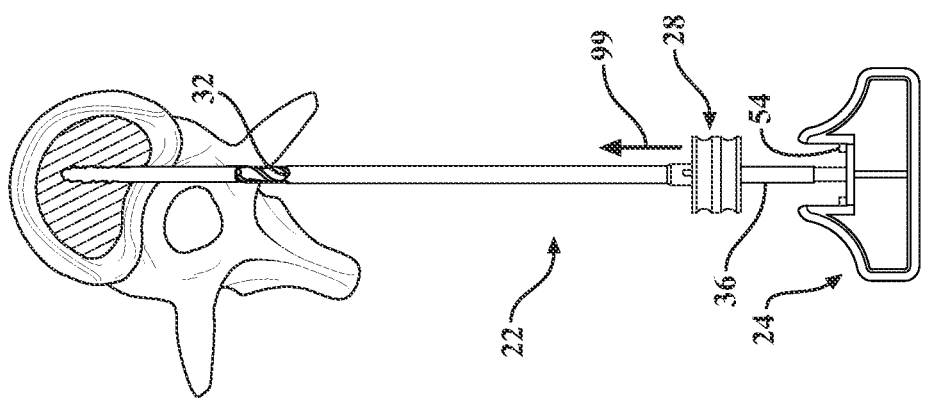
Figure 9F:
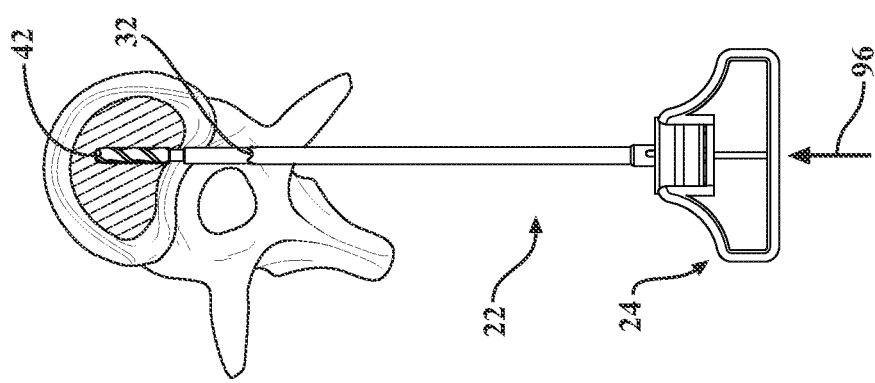
Figure 9E:
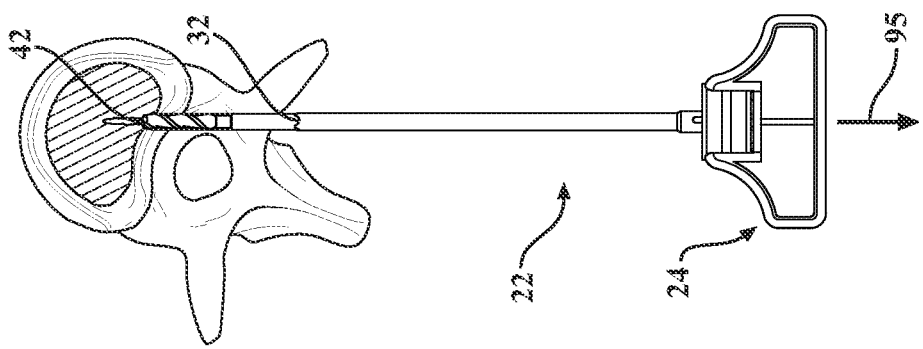

The stylet 26 is removed from the reamer 24 (arrow 95). The reamer 24 may be further advanced into the vertebral body, if desired, as shown in FIG. 9F. Again, the purchase between the reamer head 38 and the pedicle may sufficiently constrain the trajectory with further advancement of the reamer 24. Once the reamer head 38 has formed the working channel to the desired depth, as confirmed on fluoroscopy, the method may include advancing the working cannula 22 along the reamer 24 such that the working cannula 22 engages the pedicle. FIG. 9G shows the working cannula 22 being directed distally (arrow 99) for the distal end 32 of the working cannula 22 to have purchase within the pedicle. Prior to advancing the working cannula 22, the cannula hub 28 may be decoupled from the reamer hub 34. More particularly, the first reamer coupling feature 54 may be decoupled from the cannula coupling feature 56 through rotation or another input. Once decoupled, the working cannula 22 may be slid along the reamer shaft 36. Thereafter, the reamer 24 may be removed from the working cannula 22 (arrow 98). As best shown in FIG. 9H, the working channel is formed within the vertebral body for insertion of an implant or subsequent instrumentation through the working cannula 22 engaging the pedicle.

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

Certain inventive aspects of the present disclosure are described with reference to the following exemplary clauses:

Clause 1—A system for providing access to within a vertebral body through a pedicle, the system comprising: a working cannula comprising a cannula hub, and a cannula shaft extending from the cannula hub to a distal end; a reamer comprising a reamer hub defining a reamer hub passageway, a reamer coupling feature within the reamer hub passageway, a reamer shaft extending from the reamer hub and defining a reamer lumen coaxial with the reamer hub passageway, and a reamer head disposed on the reamer shaft, wherein the reamer shaft is removably disposed within the working cannula with the reamer head positioned distal to the distal end of the cannula shaft; and a stylet comprising a stylet hub, a stylet coupling feature disposed on the stylet hub, and a stylet shaft extending from the stylet hub and terminating a tip, wherein the stylet coupling feature is configured to be removably coupled with the reamer coupling feature.

Clause 2—The system of clause 1, wherein the reamer coupling feature and the stylet coupling feature are selected from the group consisting of complementary threads, a detent, a clip, a spring-loaded pin, interference fit, and friction fit.

Clause 3—A system for providing access to within a vertebral body through a pedicle, the system comprising: a working cannula comprising a cannula hub, and a cannula shaft extending from the cannula hub to a distal end; a reamer comprising a reamer hub, a reamer shaft extending from the reamer hub and defining a reamer lumen, and a reamer head disposed on the reamer shaft, wherein the reamer shaft is removably disposed within the working cannula with the reamer head positioned distal to the distal end of the cannula shaft; and a stylet comprising a stylet hub, and a stylet shaft extending from the stylet hub and terminating a tip, wherein the stylet shaft is removably disposed within the reamer, a spacer device removably positionable between the reamer hub and the stylet hub.

Clause 4—The system of clause 3, wherein the spacer device is configured to be removably coupled to the stylet shaft.

Clause 5—The system of clause 3 or 4, wherein the spacer device includes a spacer body defining a central bore, and a slot extending longitudinally from an outer surface of the spacer body to the central bore, wherein the slot is sized to receive the stylet shaft.

Clause 6—The system of clause 5, wherein the spacer device further includes flanges disposed on opposing ends of the spacer body.

Clause 7—The system of clause 5 or 6, wherein the spacer device further includes a grip extending radially from the spacer body.

Clause 8—A method of providing access to within a vertebral body through a pedicle with a system including a working cannula, a reamer removably disposed within the working cannula and including a reamer hub and a reamer head, a stylet removably disposed within the reamer and including a stylet hub and a stylet shaft, and a spacer device removably disposed between the reamer hub and the stylet hub, the method comprising the steps of: inserting a tip of the stylet into the pedicle of the vertebral body, wherein the spacer device prevents distal movement of the stylet hub relative to the reamer hub; removing the spacer device from between the reamer hub and the stylet hub; advancing the stylet within the reamer and such that the tip of the stylet is deployed through the pedicle and to within the vertebral body; thereafter, advancing the reamer along the stylet while operating the reamer to drill through the pedicle with the reamer head; removing the stylet from the reamer; advancing the working cannula along the reamer such that a distal end of the working cannula engages the pedicle; and removing the reamer from the working cannula.

Clause 9—The method of clause 8, wherein the spacer device is removably coupled to the stylet shaft, wherein the step of removing the spacer device further includes decoupling the spacer device from the stylet shaft.

Clause 10—The method of clause 8 or 9, wherein the step of advancing the stylet within the reamer further includes impacting the stylet hub with a surgical mallet.

Clause 11—The method of any one of clauses 8-10, wherein the step of deploying the tip of the stylet deployed through the pedicle and to within a posterior one-third zone within the vertebral body.

Clause 12—A method of providing access to within a vertebral body through a pedicle with a system including a working cannula, a reamer removably disposed within the working cannula and including a reamer hub and a reamer head, a stylet removably disposed within the reamer and including a stylet hub, and coupling features removably coupling the reamer hub and the stylet hub, the method comprising the steps of: inserting a tip of the stylet into the pedicle of the vertebral body, wherein the coupling features prevent movement of the stylet hub relative to the reamer hub; advancing the stylet and the reamer to engage the reamer head with the pedicle; decoupling the coupling features; removing the stylet from the reamer; operating the reamer to drill through the pedicle with the reamer head; advancing the working cannula along the reamer such that a distal end of the working cannula engages the pedicle; and removing the reamer from the working cannula.

Clause 13—The method of clause 12, further comprising stopping advancement the stylet and the reamer upon detecting resistance from the pedicle.

Clause 14—The method of clause 12 or 13, wherein the coupling features are complementary threads, the method further comprising rotating the stylet hub relative to the reamer hub to decouple the complementary threads, thereby providing a mechanical advantage to disengage the tip of the stylet engaged with the pedicle.

Clause 15—The method of any one of clauses 12-14, further comprising, prior to the step of decoupling the coupling features: retracting the stylet relative to the reamer; and visualizing alignment between the stylet hub and indicia on the reamer hub, wherein the alignment is indicative of a distance by which the tip of the stylet is beyond a distal end of the reamer.

Clause 16—The method of any one of clauses 12-15, further comprising, prior to the step of decoupling the coupling features, alternatingly retracting the stylet relative to the reamer and advancing the reamer within the pedicle.

Clause 17—The method of any one of clauses 12-16, further comprising advancing the stylet while simultaneously operating the reamer to drill through the pedicle to within the vertebral body.

Clause 18—The method of any one of clauses 8-17, wherein a cannula hub of the working cannula is removably coupled to the reamer hub, the method further comprising decoupling the cannula hub from the reamer hub prior to the step of advancing the working cannula along the reamer.

Clause 19—The method of any one of clauses 8-18, further comprising delivering an implant through the working cannula and to within the vertebral body after the step of removing the reamer from the working cannula.

The invention claimed is:

1. A system for providing access to within a vertebral body through a pedicle, the system comprising:
   a working cannula comprising a cannula hub, and a cannula shaft extending from the cannula hub to a distal end;
   a reamer comprising a reamer hub, a reamer shaft extending from the reamer hub and defining a reamer lumen, and a reamer head disposed on the reamer shaft, wherein the reamer shaft is removably disposed within the working cannula with the reamer head positioned distal to the distal end of the cannula shaft with the reamer hub removably coupled to the cannula hub;
   a stylet comprising a stylet hub, and a stylet shaft extending from the stylet hub and terminating a tip, wherein the stylet shaft is removably disposed within the reamer with the tip of the stylet being positioned distal to the reamer head with the stylet hub being positioned proximal to the reamer hub; and
   a spacer device configured to be removably positioned between the reamer hub and the stylet hub so as to prevent distal movement of the stylet relative to the reamer.

2. The system of claim 1, wherein the reamer hub defines a distal cavity sized to receive the cannula hub, and a reamer hub passageway configured to receive the stylet shaft.

3. The system of claim 2, wherein the reamer hub further comprises a first reamer coupling feature disposed within the distal cavity and configured to be removably coupled with a cannula coupling feature of the cannula hub.

4. The system of claim 2, wherein the reamer hub further comprises a second reamer coupling feature disposed within the reamer hub passageway and configured to be removably coupled with a stylet coupling feature of the stylet hub.

5. The system of claim 4, wherein the second reamer coupling feature and the stylet coupling feature are complementary threads.

6. The system of claim 1, wherein the spacer device is configured to be removably coupled to the stylet shaft.

7. The system of claim 1, wherein the distal end of the cannula shaft is configured to be spaced apart from the reamer head by a distance such that, with the reamer head engaging the pedicle, the distal end of the working cannula is external to soft tissue overlying the pedicle.

8. The system of claim 1, wherein the stylet hub comprises a proximal impaction surface configured to be impacted by a surgical mallet.

9. A system for providing access to within a vertebral body through a pedicle, the system comprising:
   a working cannula comprising a cannula hub, and a cannula shaft extending from the cannula hub to a distal end;
   a reamer comprising a reamer hub, a reamer shaft extending from the reamer hub to a distal end and defining a reamer lumen, and a reamer head disposed on the reamer shaft, wherein the reamer shaft is removably disposed within the working cannula with the reamer head positioned distal to the distal end of the cannula shaft, and wherein the reamer hub comprises indicia; and
   a stylet comprising a stylet hub, and a stylet shaft extending from the stylet hub and terminating a tip, wherein the stylet shaft is removably disposed within the reamer, wherein the stylet hub is configured to be aligned with the indicia of the reamer hub to indicate a distance by which the tip of the stylet is positioned distal to the distal end of the reamer,
   wherein the reamer hub defines a slot and the indicia, and wherein a distal edge of the stylet hub is visible through the slot to be aligned with the indicia.

10. The system of claim 9, wherein the reamer hub comprises a handle, and a handle lug disposed within the handle to define a gap, and wherein the stylet hub is movable within the gap.

11. The system of claim 10, wherein the reamer hub further comprises external threads disposed on the handle lug, and wherein the stylet hub comprises internal threads configured to engage the external threads.

12. The system of claim 9, wherein the stylet hub comprises a proximal impaction surface configured to be impacted by a surgical mallet.

13. A system for providing access to within a vertebral body through a pedicle, the system comprising:
    a working cannula comprising a cannula hub, and a cannula shaft extending from the cannula hub to a distal end;
    a reamer comprising a reamer hub, a reamer shaft extending from the reamer hub and defining a reamer lumen, and a reamer head disposed on the reamer shaft, wherein the reamer shaft is removably disposed within the working cannula with the reamer head positioned distal to the distal end of the cannula shaft with the reamer hub removably coupled to the cannula hub; and
    a stylet comprising a stylet hub, and a stylet shaft extending from the stylet hub and terminating a tip, wherein the stylet shaft is removably disposed within the reamer with the tip of the stylet being positioned distal to the reamer head with the stylet hub being positioned proximal to the reamer hub,
    wherein the reamer hub defines a slot and comprises markings, and wherein a distal edge of the stylet hub is visible through the slot to be aligned with the markings.

14. The system of claim 13, wherein the reamer hub comprises a handle, and a handle lug disposed within the handle to define a gap, and wherein the stylet hub is movable within the gap.

15. The system of claim 13, wherein the reamer hub comprises a first coupling feature configured to be removably coupled with the cannula hub, and a second coupling feature configured to be removably coupled with the stylet hub.

16. The system of claim 15, wherein the reamer hub defines a distal cavity, wherein the first coupling feature is disposed within the distal cavity.

17. The system of claim 15, wherein the second coupling feature is threads.

18. The system of claim 17, wherein the reamer hub defines a reamer hub passageway, wherein the threads are disposed about the reamer hub passageway.

19. The system of claim 13, wherein the stylet hub comprises a proximal impaction surface configured to be impacted by a surgical mallet.

* * * * *